(12) United States Patent
Quayle et al.

(10) Patent No.: US 7,356,455 B2
(45) Date of Patent: Apr. 8, 2008

(54) OPTIMIZED INTERFACE FOR SIMULATION AND VISUALIZATION DATA TRANSFER BETWEEN AN EMULATION SYSTEM AND A SIMULATOR

(75) Inventors: Barton Quayle, San Jose, CA (US); Mitchell G. Poplack, Mountain View, CA (US)

(73) Assignee: Quickturn Design Systems, Inc., San Jose, CA (US)

( * ) Notice: Subject to any disclaimer, the term of this patent is extended or adjusted under 35 U.S.C. 154(b) by 364 days.

(21) Appl. No.: 10/975,676

(22) Filed: Oct. 28, 2004

(65) Prior Publication Data

US 2005/0114113 A1    May 26, 2005

Related U.S. Application Data (60) Provisional application No. 60/520,945, filed on Nov. 18, 2003.

(51) Int. Cl.
  G06F 9/455   (2006.01)
  G06F 17/50   (2006.01)
  G06G 7/62    (2006.01)
  G06F 11/00   (2006.01)

(52) U.S. Cl. ............................. 703/23; 703/28; 703/13; 703/14; 703/24; 703/25; 703/26; 703/27; 714/30; 714/34

(58) Field of Classification Search ............ 703/23–28, 703/13–14; 714/30, 34
See application file for complete search history.

(56) References Cited

U.S. PATENT DOCUMENTS 5,313,231 A    5/1994  Yin et al. .................... 345/199
5,446,482 A    8/1995  Van Aken et al. ........... 345/199
5,481,684 A    1/1996  Richter et al. ............... 395/375
5,594,854 A    1/1997  Baldwin et al. ............. 395/141
5,621,651 A *  4/1997  Swoboda ...................... 703/23
5,737,520 A    4/1998  Gronlund et al. ....... 395/183.15
5,764,895 A    6/1998  Chung ..................... 395/700.8
5,768,567 A    6/1998  Klein et al. ................. 395/500
5,828,884 A   10/1998  Lee et al. .................... 395/705
5,838,948 A   11/1998  Bunza ........................ 395/500
5,894,563 A    4/1999  Saperstein .................. 395/309
5,937,170 A    8/1999  Bedarida .................... 395/280

(Continued)

FOREIGN PATENT DOCUMENTS

EP           1349092 A2     10/2003

OTHER PUBLICATIONS

European Search Report dated Feb. 23, 2007.

(Continued)

*Primary Examiner*—Kamini Shah
*Assistant Examiner*—David Silver
(74) *Attorney, Agent, or Firm*—Orrick Herrington & Sutcliffe, LLP (57) ABSTRACT

An optimized interface for simulation and visualization data transfer between an emulation system and simulator is disclosed. In one embodiment, a method of transferring data between a simulator to an emulator across an interface, comprises updating a simulator buffer of the simulator to contain a desired input state for an emulation cycle. A target write to the interface is performed to indicate that the emulation cycle can proceed. The emulation cycle is completed using an instruction sequencer within the interface independent of the simulator.

8 Claims, 6 Drawing Sheets

U.S. PATENT DOCUMENTS

| | | | |
|---|---|---|---|
| 5,960,201 A | 9/1999 | Ma et al. .................... | 395/705 |
| 5,961,640 A | 10/1999 | Chambers et al. .......... | 712/300 |
| 5,970,236 A | 10/1999 | Galloway et al. ........... | 395/500 |
| 5,970,241 A | 10/1999 | Deao et al. ................. | 395/568 |
| 5,996,036 A | 11/1999 | Kelly ......................... | 710/110 |
| 6,009,256 A | 12/1999 | Tseng et al. | |
| 6,026,230 A * | 2/2000 | Lin et al. ..................... | 703/13 |
| 6,134,516 A * | 10/2000 | Wang et al. ................. | 703/27 |
| 6,389,379 B1 * | 5/2002 | Lin et al. ..................... | 703/14 |
| 6,522,985 B1 * | 2/2003 | Swoboda et al. ........... | 702/117 |
| 6,539,497 B2 * | 3/2003 | Swoboda et al. ............ | 714/30 |
| 6,546,505 B1 * | 4/2003 | Swoboda et al. ............ | 714/30 |
| 6,704,895 B1 * | 3/2004 | Swoboda et al. ........... | 714/726 |
| 6,760,866 B2 * | 7/2004 | Swoboda et al. ............ | 714/34 |
| 6,785,873 B1 * | 8/2004 | Tseng .......................... | 716/4 |
| 6,996,747 B2 * | 2/2006 | Swoboda et al. ............ | 714/30 |

OTHER PUBLICATIONS

U.S. Appl. No. 09/226,997, filed Jan. 7, 1999; Direct Altach Stimulus Card, William F. Beausoleil, et al.

* cited by examiner

FIG. 6 the field of the invention relates generally to hardware
OPTIMIZED INTERFACE FOR SIMULATION AND VISUALIZATION DATA TRANSFER BETWEEN AN EMULATION SYSTEM AND A SIMULATOR

RELATED APPLICATIONS

This application claims the benefit of U.S. Provisional Application Ser. No. 60/520,945, filed on Nov. 18, 2003. The contents of U.S. Provisional Application Ser. No. 60/520,945 are incorporated herein by reference in their entirety.

FIELD OF THE INVENTION

The field of the invention relates generally to hardware and software verification of logic circuits and more particularly relates to a communication protocol and communication control hardware that optimizes the bandwidth and latency of data transfer between a program running on a workstation and a hardware verification system.

BACKGROUND OF THE INVENTION

Prior to manufacture of an integrated circuit, designers verify the functionality of their designs (referred to herein as the "design under verification", or "DUV"). The DUV is usually provided in the form of a netlist description of the design. The netlist may have been derived from many sources, including from a hardware description language. A netlist description (or "netlist", as it is referred to by those of ordinary skill in the art) is a description of the circuit's components and electrical interconnections between the components. The components include all those circuit elements necessary for implementing a logic circuit, such as combinational logic (e.g., gates) and sequential logic (e.g., flip-flops and latches).

Design verification is performed because fabricating an integrated circuit is expensive and takes time. If the circuit design contains functional errors, the design will have to be corrected and then re-fabricated. Thus, many different platforms for functional verification of integrated circuits have been developed. Hardware-based design verification systems such as logic emulation systems are known devices that implement a user's design in a plurality of programmable integrated circuits. Such logic emulation systems are available from various vendors, including Cadence Design Systems, Inc., San Jose, Calif., United States of America, and others. Typical emulation systems utilize either programmable logic chips or processor chips that are programmably interconnected. In processor-based emulation systems, the DUV is processed so that its functionality appears to be created in the processors by calculating the outputs of the design. The logic itself is not implemented in a processor-based emulation system. Examples of hardware logic emulation systems using processor chips can be seen in, e.g., U.S. Pat. Nos. 5,551,013, 6,035,117 and 6,051,030. U.S. Pat. Nos. 5,551,013, 6,035,117 and 6,051,030 are incorporated herein by reference.

Another type of design verification system is known as a software simulator. Software simulators differ from hardware verification solutions in that the simulation software is executed in general-purpose computers rather than in specialized hardware like an emulation system. Simulation is a software-based approach, in which the DUV (or a portion thereof) and testbench are compiled into machine executable model and executed in workstation or PC. A testbench is a series of test vectors (i.e., stimulus) that are used to stimulate a design and may include modules that receive the outputs from the DUV after the vectors are run in the DUV. Since most electronic designs are presently designed using hardware description languages ("HDL") such as Verilog, a testbench is typically comprised of some HDL code.

Hardware-based verification systems and software-based verification systems each have benefits that the other lack. For example, software-based verification systems allow for very accurate verification using the exact timing (i.e., clocking) that the actual DUV will encounter when installed in a real electronic system. Software simulators allow a user to see the result of every logic operation and can graphically represent the signal transitions from high to low or from low to high on a computer monitor. While hardware-based verifications systems do not normally have this ability, hardware-based systems are orders of magnitude faster than software-based systems and therefore provide very fast verification.

In order to debug a DUV, the designer needs to look into activities of design signals over time. The reason for this is that digital circuits are driven by one or more clocks, and errors can occur at various transitions of the clocks driving the DUV. The designer faces at least two issues when evaluating design signals over time. One issue is which signal to observe (i.e., which node in the DUV to observe). A second issue is when to observe the signals (i.e., at what clock transition and/or which confluence of events—sometimes referred to as a trigger). These two issues impose serious challenges to simulation and emulation tools. First, circuit designs are typically very large (e.g., in the order of million gates). Second, the number of signals the designer would like to observe is proportionally large. Third, since the time window in which design signals need to be observed (referred to herein as the "trace window") is hard to predict prior to simulation or emulation, the designer who is debugging a design would prefer the trace window to be as large as possible.

In order to handle these issues, circuit designers have used various approaches. One such approach is to run the DUV lockstep in a simulator. With this approach, progress of simulation is controlled by the designer in interactive operation. Designers can run simulation, stop and observe signals, continue, and repeat the process. When simulation stops, designers can check the state of any signal in the design. A second approach is to perform free running simulation with signal dump. With the "free running" approach, simulation is executed freely without user intervention, and signals to be observed during simulation are dumped out during simulation. It is important to note that the signals to be dumped out must be specified before the simulation starts. These simulation approaches, while effective, are very slow. A third approach is to emulate the DUV using an emulator that allows full visibility for a fixed size of trace window. In this approach, the emulator is running freely, and signals generated by the DUV in the emulator that allow for full vision are saved for a certain period of time. A final approach is to emulate the DUV with an emulator that provides for limited visibility and replay. With this approach, limited information is saved during emulation. Designers might need to run emulation a few times in order to get sufficient information for analysis.

As discussed, one way of using a hardware-based verification system is in conjunction with a software simulator. This is sometimes referred to as simulation acceleration. Because emulators operate at speeds that can be orders of magnitude faster than simulators, emulation systems, and in particular, processor-based emulation systems, contain vast amounts of information about the state and activity in the emulated circuit. The reason for this is as follows. Simulators allow designers to view the state of a signal as it exists at a specific node in the DUV at a specific time (i.e., clock cycle) immediately after a single cycle of a simulation. A simulation cycle is the amount of time (and thus the state changes that take place) during one step of the fastest clock driving the DUV. In other words, a simulation cycle is the time of interest during a verification operation because any signal transitions that take place during simulation cycle are typically not relevant. The only signal transitions that generally are important in a DUV are the signal transitions that exist at the end of one simulation cycle.

In simulation environments, the stimuli that drive the DUV during a simulation cycle are modeled on the workstation. In contrast, in simulation acceleration environments, the stimuli driving the DUV are sent to the emulator that is emulating the DUV, and the response is then sent back to the simulator. Because emulators run the DUVs at clock speeds that are dramatically faster than simulators, simulation acceleration can dramatically decrease the amount of time it takes to verify a DUV.

User interfaces and software simulators need constant access to this state information in order to make simulation acceleration worthwhile. Simulation engines also need immediate responses to state changes in the emulated circuit to continue simulation, which requires low latency (i.e. the simulator and the emulator generally need to run in lockstep mode). In addition, the sheer volume of data required and made available in a large emulation requires a high bandwidth connection.

The cycle time for simulation acceleration is generally defined as the amount of time it takes to send signals from the simulator to the emulator, the time the emulator takes to calculate what changes occurred in the signals running through the DUV, and the time required to send those changes back to the simulator running in the workstation. Latency, which is a key issue in simulation acceleration, is the amount of time it takes to get a response from the emulator. For simulation acceleration to be a useful verification method, latency must be reduced as much as possible.

At least one prior solution exists that attempts to provide low latency and high bandwidth between the hardware-based verification system (e.g., the emulator) and the software-based verification system (e.g., the simulator). In one prior solution, the software simulator accesses the states of the emulator by querying the emulator through a high latency Ethernet path to a local processor in the emulator and then across an address/data handshake path to access individual components in the emulation system. In a second prior solution, the Direct Attach Stimulus ("DAS") interface connects to a series of register circuits programmed into the emulated logic of the DUT. Software simulation accesses are grouped into a burst of data into and/or out of these registers. This burst of data is transferred across a 31 bit data path between the emulated registers and a memory buffer on the PCI card in the workstation. The simulator hands the data to a "DAS driver", which formats it and transfers it to the PCI memory buffer and initiates the transfer. Once complete, the driver transfers the return data back to the simulator's buffer. The DAS card is a product available from Cadence Design Systems, Inc., San Jose, Calif., that provides for communication between a simulator running in a workstation or personal computer and an emulator.

A problem with the first prior approach is that the network path to the embedded processor in the emulation system has very high latency due to the reaction time of the local processor that receives the request, accesses the appropriate element(s) in the emulation engine, then formulates a response, and sends it across the network to the workstation application.

In the prior art DAS architecture mentioned above, as in many workstation interfaces, latency and bandwidth are dependent upon the input/output ("I/O") subsystem of the workstation, the PCI bus, local hard disk accesses, and access to I/O resources such as DMA engines. This is true for the setup of the transfer as well as the transfer itself. In addition, in the previous DAS architecture, only 31 bits of each 32 bits within workstation memory could be used as emulation data due to hardware limitations. This results in an undesirable situation where long vectors of bits in the simulator could not be mapped directly to contiguous bits in the DAS packet buffer, requiring software to pack the bits in such a way as to avoid the gaps.

Because simulation acceleration is becoming more popular while the number of signals generated by the DUV being executed in the emulation system is increasing, there is a need for an improved means of transferring signals and instructions between simulators running in a workstation and emulators that are communicating with those simulators.

SUMMARY

An optimized interface for simulation and visualization data transfer between an emulation system and simulator is disclosed. In one embodiment, a method of transferring data between a simulator to an emulator across an interface, comprises updating a simulator buffer of the simulator to contain a desired input state for an emulation cycle. A target write to the interface is performed to indicate that the emulation cycle can proceed. The emulation cycle is completed using an instruction sequencer within the interface independent of the simulator.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

An optimized interface for simulation and visualization data transfer between an emulation system and simulator is disclosed. In one embodiment, a method of transferring data between a simulator running in a workstation to an emulator across an interface, comprises updating a simulator buffer of the simulator to contain a desired input state for an emulation cycle. A target write to the interface is performed to indicate that the emulation cycle can proceed. The emulation cycle is completed using an instruction sequencer within the interface independent of the simulator.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Turning to the figures, the presently preferred apparatus and methods of the present teachings will now be described. The various embodiments disclosed herein minimize effects of delays in transferring data between workstation and emulator by providing DMA control and optimizing the PCI transfers. These embodiments also minimize the setup required to initiate and complete a data transfer. A wider datapath also increases bandwidth. The various embodiments employ an architecture that includes a packetized transfer protocol that injects stimulus and extracts data directly from the emulation logic (hence the name: direct attach stimulus) by interfacing with control logic embedded in the emulated circuit, which organizes the data of interest into packets, and controls the transfer to synchronize it to the emulation circuitry.

Figure 1:
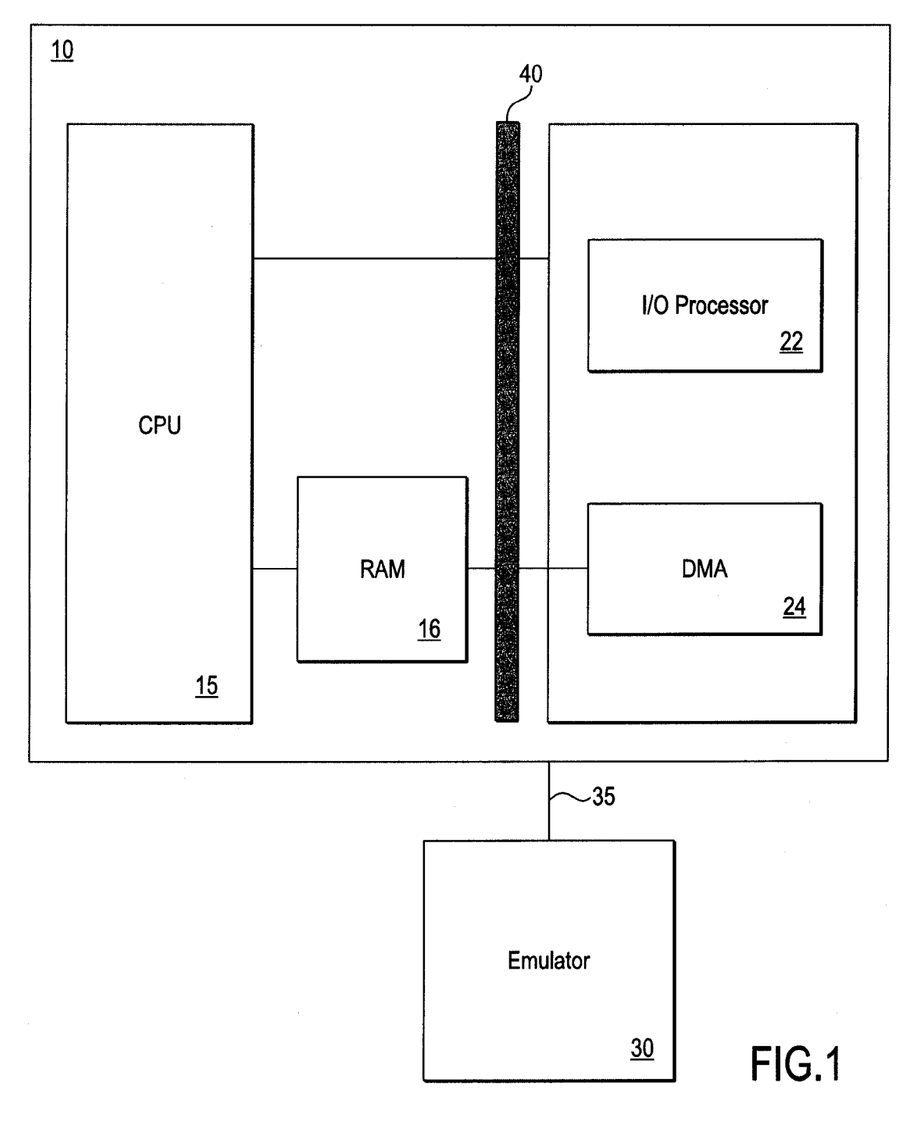
FIG. 1 illustrates a block diagram of an exemplary high-speed interface, according to one embodiment of the present invention.

FIG. 1 illustrates a block diagram of an exemplary high-speed interface, according to one embodiment. More specifically, interface 20 is a low latency interface between a workstation 10 running simulation programs and an emulation system 30. A workstation 10 has a central processing unit ("CPU") 15 that can execute computer instructions, including instructions forming a software simulation program. The workstation can be any type of computing device including a personal computer, etc. Workstation 10 also has memory in the form of random access memory (RAM) 18 that is in communication with the CPU 15. CPU 15 is also connected to the interface 20. Interface 20 is in communication with a hardware-based functional verification device 30 such as an emulation system though a cable 35. Interface 20 comprises an I/O processor 22 that communicates with direct memory access ("DMA") module 24. As will be seen below, DMA 24 allows signals acquired from the emulation system 30 during hardware acceleration to be directly stored into the RAM 18 without the need to use the CPU 15.

The interface 20 can be placed on a single card that can be inserted into the workstation 10. In the presently preferred embodiments, interface 20 communicates with the workstation through a Peripheral Component Interconnect bus 40, commonly referred to as a "PCI bus". A PCI bus 40 is a standard bus that allows peripherals to communicate with a computer system such as a workstation. The workstation 10 may be a SUN Ultra 60, Ultra 80, Ultra 450, Blade 1000, HPJ6000, IBM RS/6000 F80, Dell Workstation 530, IBM Intellistation ZPro 6866, or similar computing device. The interface 20 allows signals to be transferred back and forth between the emulator 30 and the simulator running on the workstation 10 through the PCI bus 40 in the workstation 10. The interface 20 is necessary because the emulator can produce and receive far more signals than a PCI bus 40 can handle. The interface 20 gathers data directly from the RAM 18 and transfers it over interface 35 to the emulator 30 and simultaneously transfers data from the emulator 30 back into the RAM 18, utilizing the DMA 24. In other words, the PCI bus 40 lacks both the bandwith and has far too much latency to allow design signals generated in the emulator to be evaluated in the simulator in a useful manner.

Figure 2:
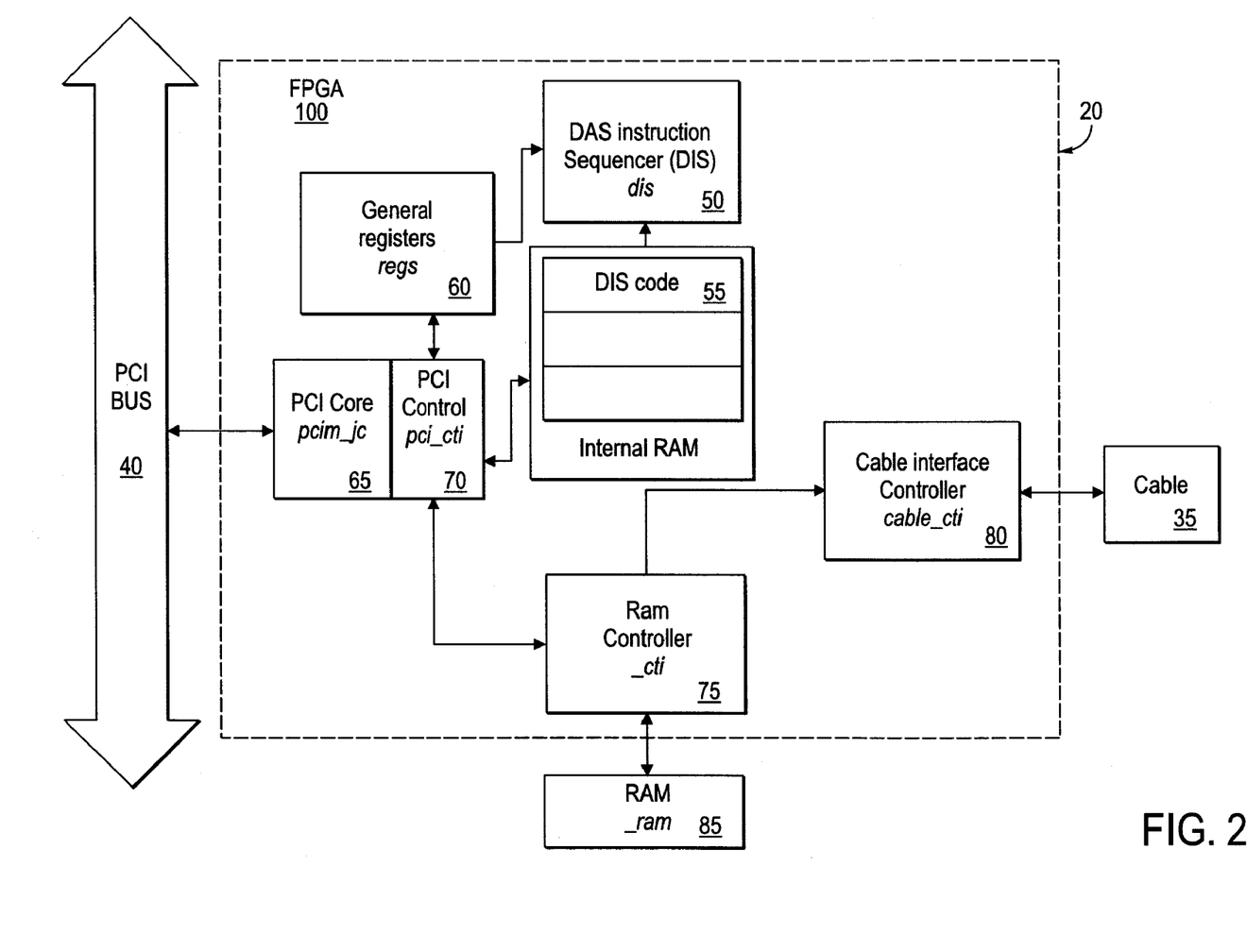
FIG. 2 illustrates a block diagram showing exemplary data paths of the interface 20, according to one embodiment of the present invention.

FIG. 2 illustrates a block diagram showing exemplary data paths of the interface 20, according to one embodiment of the present invention. Many of the functions of interface 20 can be programmed within a field programmable gate array ("FPGA"). Interface 20 includes a PCI core 65 that acts as the interface between the PCI bus 40 and the remaining components of the interface 20. PCI core 65 implements standard PCI protocols so that interface 20 can place data on and receive data from the PCI bus 40. PCI core 65 can be implemented as a standard component, that can be acquired from several different vendors. According to one embodiment, the PCI core 65 is provided by a Xilinx Virtex-II 64 bit, 66 MHz, Master/target IP core. A PCI controller 70 communicates with the PCI core 65. The PCI controller acts as the interface between the PCI core 65 and the rest of the interface 20. In presently preferred embodiments, there is no communication between the PCI core 65 and any other portion of the interface 20. PCI controller 70 allows access from the PCI bus 40 to memories and registers within the interface 20. In presently preferred embodiments, all accesses to and from the PCI bus 40 can be either thirty-two or sixty-four bits wide. The PCI controller 70 can act as PCI initiator of both read and write burst transfers to host memory.

Interface 20 also comprises instruction sequencer ("IS") 50 that enables the interface 20 to perform sequences of operations. Exemplary instruction sequences are as follows:

| Description | Sequence of Opcodes | Description |
|---|---|---|
| Full emulation cycle | PDN | Download block to buffer |
| | CDN | Download buffer to emulator |
| | CUP | Upload from emulator, compare |
| | PUP | Upload block to workstation memory |
| | PCIW | Write done flag to workstation memory |
| | IDLE | Idle. |
| Full emulation cycle with status updates and streaming upload. | PDN | Download block to buffer |
| | PCIW | Write status flag to workstation memory |
| | CDN | Download buffer to emulator |
| | CUP | Upload (partial data) from emulator, compare |
| | PCIW | Write status flag to workstation memory. |
| | SYNC | Synchronize PCI and cable counters to prepare for streaming upload |
| | CUP | Upload (all data) from emulator, proceed to next instruction immediately |
| | PCIW | Write status flag to workstation memory, proceed to next instruction immediately |

-continued

| Description | Sequence of Opcodes | Description |
|---|---|---|
| | PUP | Upload block to workstation memory, wait for completion. |
| | PCIW | Write done flag to workstation memory |
| | IDLE | Idle. |
| Full emulation cycle. Upload non-contiguous blocks | PDN | Download block to buffer |
| | CDN | Download buffer to emulator |
| | CUP | Upload from emulator, compare |
| | PUP | Upload block to workstation memory |
| | PUP | Upload another block to workstation memory |
| | PUP | Upload another block to workstation memory |
| | PUP | Upload another block to workstation memory |
| | PCIW | Write done flag to workstation memory |
| | INTA | Trigger processor interrupt |
| | IDLE | Idle |

The exact sequence of instructions executed by the instruction sequencer 50 is at the discretion of programmer. This flexibility gives software a greater ability to optimize the operation of the system. This architecture also makes it easier for hardware to integrate new capabilities of enhancement, through expansion of the instruction set and by plugging into the appropriate parts of the logic design.

In the simplest mode, it would be possible for the instruction sequencer 50 to execute a very short sequence consisting of a single operation followed by a PCIW (PCI write word) to indicate completion. This would be useful to support the current API mode where individual operations are performed through single API calls.

Instruction sequencer 50 also initiates data transfers from or to a cable 35 that is in communication between the interface 20 and the emulator (not shown in FIG. 2). According to one embodiment, the bandwidth of cable 35 is 96 MB/sec in each direction by having a 64-bit data path at 12 MHz. A Molex LFH 200-pin connector can be used to connect the cable to the interface 20, according to one embodiment. Finally, instruction sequencer 50 initiates memory copy instructions, which perform DMA transfers to copy memory data between the interface RAM 75 across the PCI bus 40 into the workstation RAM (e.g., RAM 18 in FIG. 1).

The instruction sequencer 50 receives instructions from an internal RAM 55 that stores instructions that are sequenced through the instruction sequencer 50. According to one embodiment, RAM 55 is internal FPGA RAM having 2 MB of storage space. Exemplary instructions that are stored in the RAM 55 are as follows:

IS Instruction Set

| Opcode (8 bits) | Bits [127:96] Address Offset: 0xC Mode (24 bits): Flow (8 bits) + Instruction Mode (16 bits) | [95:64] 0x8 Param A (up to 32 bits) | [63:32] 0x4 Param B (up to 32 bits) | [31:0] 0x0 Param C (up to 32 bits) | Description |
|---|---|---|---|---|---|
| PDN 0x20 | [1]: no-count-reset | [19:0] LEN | [31:24]: BASE [19:0]: ADDR | [31:0] PADDR | PCI DMA Download. Download block of size LEN DWORDs2 from PCI address PADDR to internal address BASE/ADDR. (Note LEN is |

-continued

IS Instruction Set

| Opcode (8 bits) | Bits [127:96] Address Offset: 0xC Mode (24 bits): Flow (8 bits) + Instruction Mode (16 bits) | [95:64] 0x8 Param A (up to 32 bits) | [63:32] 0x4 Param B (up to 32 bits) | [31:0] 0x0 Param C (up to 32 bits) | Description |
|---|---|---|---|---|---|
| | | | | | quantity of data independent of whether transfer is 32-bit or 64-bit oriented over the bus.) |
| PUP 0x21 | [1]: no-count-reset | [19:0] LEN | [31:24]: BASE [19:0]: ADDR | [31:0] PADDR | PCI DMA Upload. Upload block of size LEN DWORDs from internal address BASE/ADDR to PCI address PADDR |
| CDN 0x30 | [1]: no-count-reset [0]: compare mode | [19:0] LEN | | [19:0] SADDR | Cable Download. Download block of size LEN DWORDs from external buffer RAM address SADDR to emulator. Compare mode: the transfer repeats and the instruction does not terminate until the first uploaded word matches a pattern defined by CMPVAL and CMPMASK. |
| CUP/ CXFER 0x31 | [1]: no-count-reset [0]: compare mode | [19:0] LEN | [31:0] DADDR | [19:0] SADDR | Cable transfer, Cable upload. Download block of size LEN DWORDS from external buffer RAM address SADDR to emulator. Upload block of size LEN to external RAM address DADDR. (Transfer and upload are the same because it is impossible to do an upload without also downloading valid data in the current cable protocol.) Compare mode: see above. |
| CVAL 0x34 | | | [31:0] VAL | [31:0] VAL | Set compare value, CMPVAL, to be used for pattern matching of first uploaded word from emulator. NOTE: CVAL will not work for DDEXECs. Instead, write the registers directly. |
| CMSK 0x35 | | | [31:0] MASK | [31:0] MASK | Set compare mask, CMPMASK, to be used for pattern matching of first uploaded word from emulator. NOTE: CMSK will not work for DDEXECs. Instead, write the registers directly. |
| SYNC 0x40 | [0]: down [1]: up | | | | Sync streams. Reset stream counters. down = 1: enable download stream checking up = 1: enable upload streaming. |
| COPY 0x50 | | | [31:24]: SBASE [19:0]: SADDR | [31:24]: DBASE [19:0]: DADDR | Copy value from SADDR to DADDR. (Use with caution!) |
| REGW 0x51 | | | [31:24]: BASE [19:0]: ADDR | [31:0] VAL | Write VAL to the internally addressable register with address ADDR. (Use with caution!) NOTE: REGW will not work for DDEXECs. Instead, write the register directly. |
| PCIW 0x60 | | | [31:0] ADDR | [31:0] VAL | Write a single word of data to ADDR address MBX. Typically this would be used to update a mailbox which software would pole to ascertain the state or stage of completion of the interface card. |

-continued

IS Instruction Set

| Opcode (8 bits) | Bits [127:96] Address Offset: 0xC Mode (24 bits): Flow Mode (16 bits) + Instruction | [95:64] 0x8 Param A (up to 32 bits) | [63:32] 0x4 Param B (up to 32 bits) | [31:0] 0x0 Param C (up to 32 bits) | Description |
|---|---|---|---|---|---|
| WAIT 0x70 | [0]: scale | | | [31:0] CNT | Wait CNT counts before proceeding. scale = 0: count PCI clocks scale = 1: count microseconds (approximate) This feature is intended for integration and debugging. |
| INTA 0x80 | | | | | Issue interrupt to software. (PCI Interrupt A) |
| IDLE 0x00 | | | | | Do nothing until software issues instruction. |

It is important to note that in the presently preferred embodiment, the depth available for instruction sequencer code is five hundred twelve instructions. This space allows for several different instruction sequences to be loaded into the internal RAM 55. To switch to a different sequence, the instruction pointer in the general registers 60 is updated to the start of the desired instruction sequence.

The instruction sequencer 50 is capable of parallelizing operations where appropriate. For example, it can begin a PUP ("Upload block to workstation memory") instruction before the CUP ("Upload from emulator, compare") instruction is complete. Generally, it is preferable that the sequence instructions be properly coded so that incompatible operations do not take place simultaneously. Thus, safeguards against parallelizing operations that cannot be performed at the same time are implemented. For example, no PCI operation can be executed if another PCI operation is in progress. (In general, most operations do require the completion of most kinds of preceding operations.)

PCI controller 70 also communicates with a zero bus turnaround ("ZBT") type RAM controller 75. RAM 85 is a static RAM using a "zero bus turnaround" interface. ZBT interfaces eliminates the latency that occurs when a data bus switches from reading data to writing data (or vic versa). Using a ZBT type RAM 85 allows read and write operations to take place within a single clock cycle. The RAM controller 75 exchanges data with cable interface controller 80. Cable interface controller 80 is in communication with cable 35, which in turn is in communication with the emulator (not shown). RAM controller 75 is a pipelined controller that is optimized to make the RAM 85 read and write data as fast as possible, thus further minimizing latency. Cable interface controller 80 controls the interface's 20 handshake with the cable 35. In other words, cable interface controller 80 controls the manner in which data stored in RAM 85 is placed on cable 35.

RAM 85 acts as local memory for interface 20 by storing data that is transferred back and forth between the emulator and the simulator. Use of ZBT type RAM 85 is preferable to other RAM technologies because such memory allows both the emulator and the simulator to transfer data back and forth between each other at the same time.

Instruction sequencer 50 is controlled by data stored in general registers 60. General registers 60 store configuration information that the instruction sequencer 50 uses to get information from internal RAM 55. Exemplary registers within general registers 60 include controller information, controller mode, interrupt control, controller status, cable-in, clock control, IS instruction pointer, IS direct command, IS direct/step execute, PCI controller control, controller abort, EEPROM command, configuration JTAG command, configuration JTAG Out, configuration JTAG in, cable compare values, cable compare mask, PCI upload count, PCI download count, cable count, streaming control, and scratch. General registers 60 also establish which instructions stored in internal RAM 55 will be executed by instruction sequencer 50.

Presently preferable hardware is a 64-bit/66 MHz PCI card with a field programmable gate array (FPGA) and two megabytes of SRAM 85 that connects to a cable 35 containing sixty-six signal conductors in each direction. In the presently preferred embodiments, the general registers 60, PCI core 65, PCI controller 65, instruction sequencer 50, internal RAM 55, RAM controller 75 and cable interface controller are implemented by programming these functions into an FPGA 100.

Figure 3:
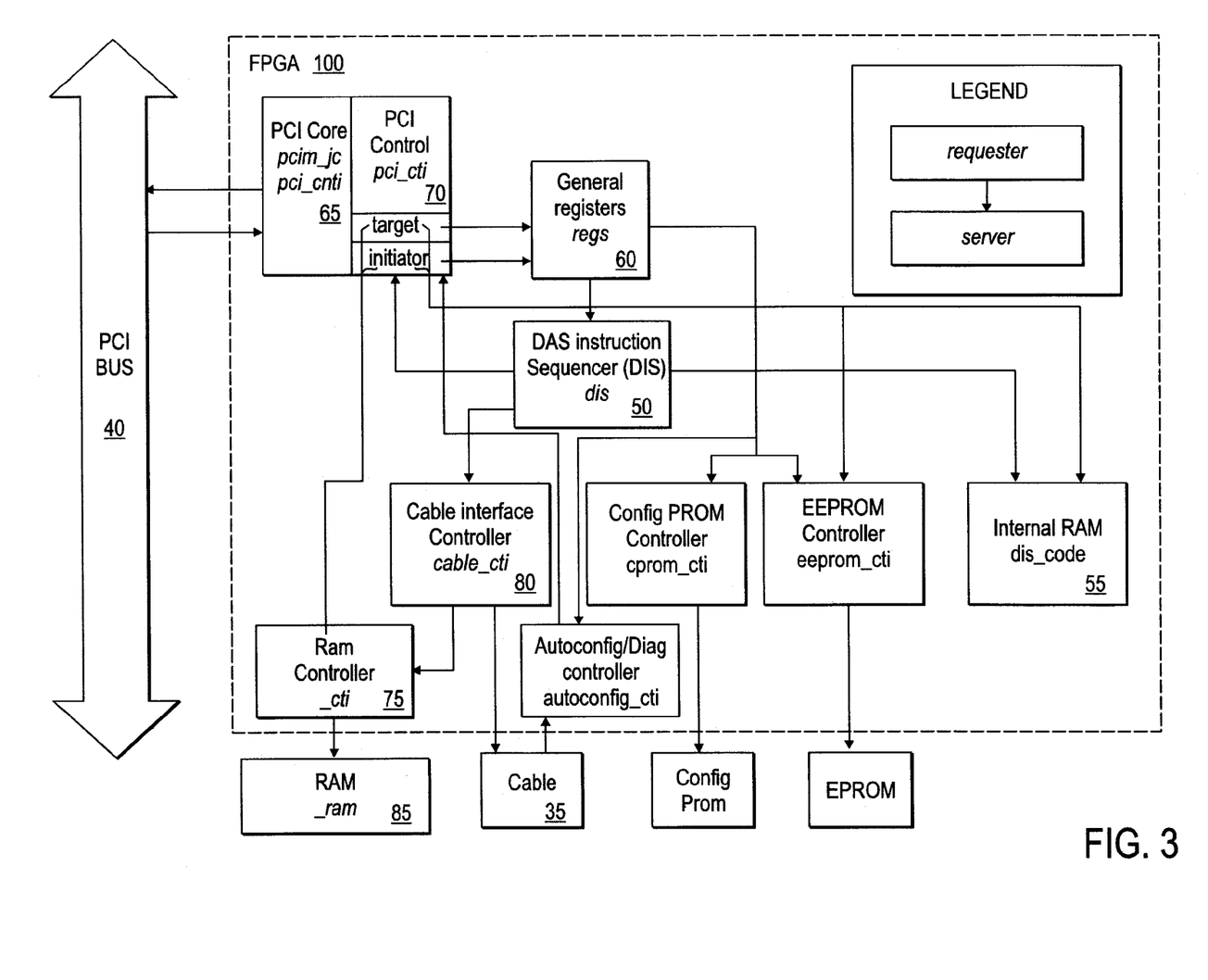
FIG. 3 illustrates exemplary logic control paths for an interface 20, according to one embodiment of the present invention.

FIG. 3 illustrates exemplary logic control paths for an interface 20, according to one embodiment of the present invention. Control is indicated by an arrowhead pointing to the controlled functional block. Thus, as is seen in FIG. 3, instruction sequencer 50 is controlled by general registers 60. In contrast, instruction sequencer 50 signals the cable interface 80 to start a cable transfer with the emulator (e.g., emulator 30 in FIG. 1). Instruction sequencer 50 also controls internal RAM 55 in order to read and process sequences of instructions. PCI controller 70 has two components. The first component of PCI controller 70 is initiator 70b, which is controlled by instruction sequencer 50. Instruction sequencer 50 controls the initiator 70b in order to start memory copy DMA operations, when are then carried out by the initiator 70b. Initiator 70b also controls general registers 60. The second component of PCI controller 70 is target 70a. Like initiator 70b of PCI controller 70, target 70a also controls the general registers 60. Target 70a and initiator 70b also control the RAM controller 75. The reason for this is this that PCI controller 70 controls when data is written to or read from PCI bus 40. Thus, target 70a and initiator 70b must control when data is read from or written to RAM 85. RAM controller 75 is also controlled by cable interface controller 80. Cable interface controller 80 has control over RAM controller 75. When the cable interface controller 80 performs a cable transfer, it directly controls the RAM controller 75 to transfer data between the cable 35 and the RAM 85. Instruction sequencer 50 controls cable interface controller 80.

Figure 4:
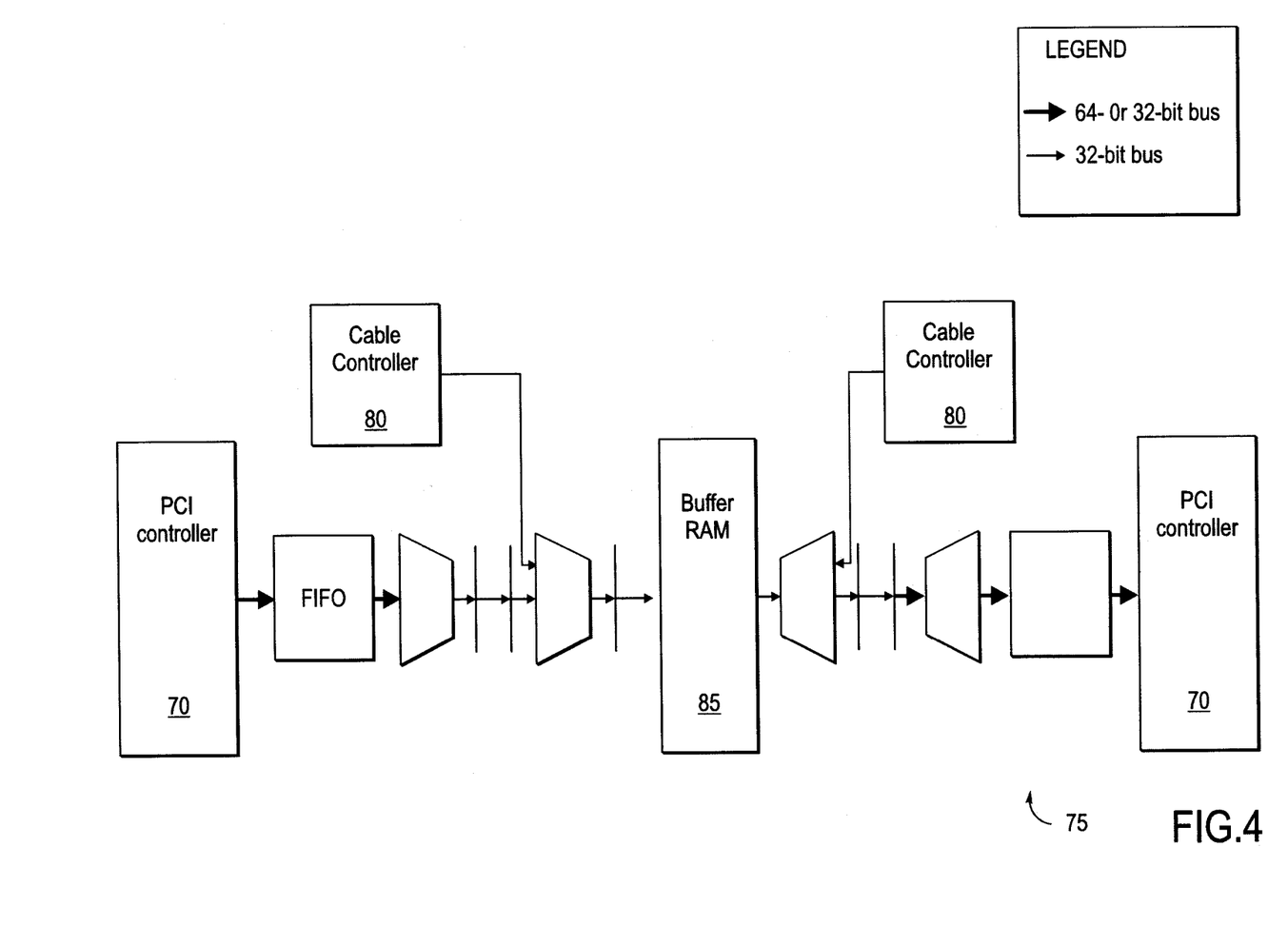
FIG. 4 illustrates a diagram of an exemplary RAM pipeline datapath, according to one embodiment of the present invention.

FIG. 4 illustrates a diagram of an exemplary RAM pipeline datapath, according to one embodiment. Streaming is made possible by a pipelined prioritized RAM controller 75, which gives priority to the cable controller 80 to access the RAM 85 (since the cable protocol cannot be suspended) while allowing all remaining bandwidth to the RAM 85 to be consumed by the PCI controller 70. The interface to RAM 85 is 32 bits wide in one embodiment. The RAM controller 75 and cable controller 80 operate at the same speed. On "read" operations, the RAM controller 75 asserts valid data and the valid flag for a single cycle. This RAM interface looks like a pipelined SRAM to the cable controller, with the valid flag to indicate the pipeline delay. Although this delay will be fixed since the RAM controller generally provides priority to the cable controller, the valid flag makes the design of the cable controller independent of the actual pipeline delay.

Figure 5:
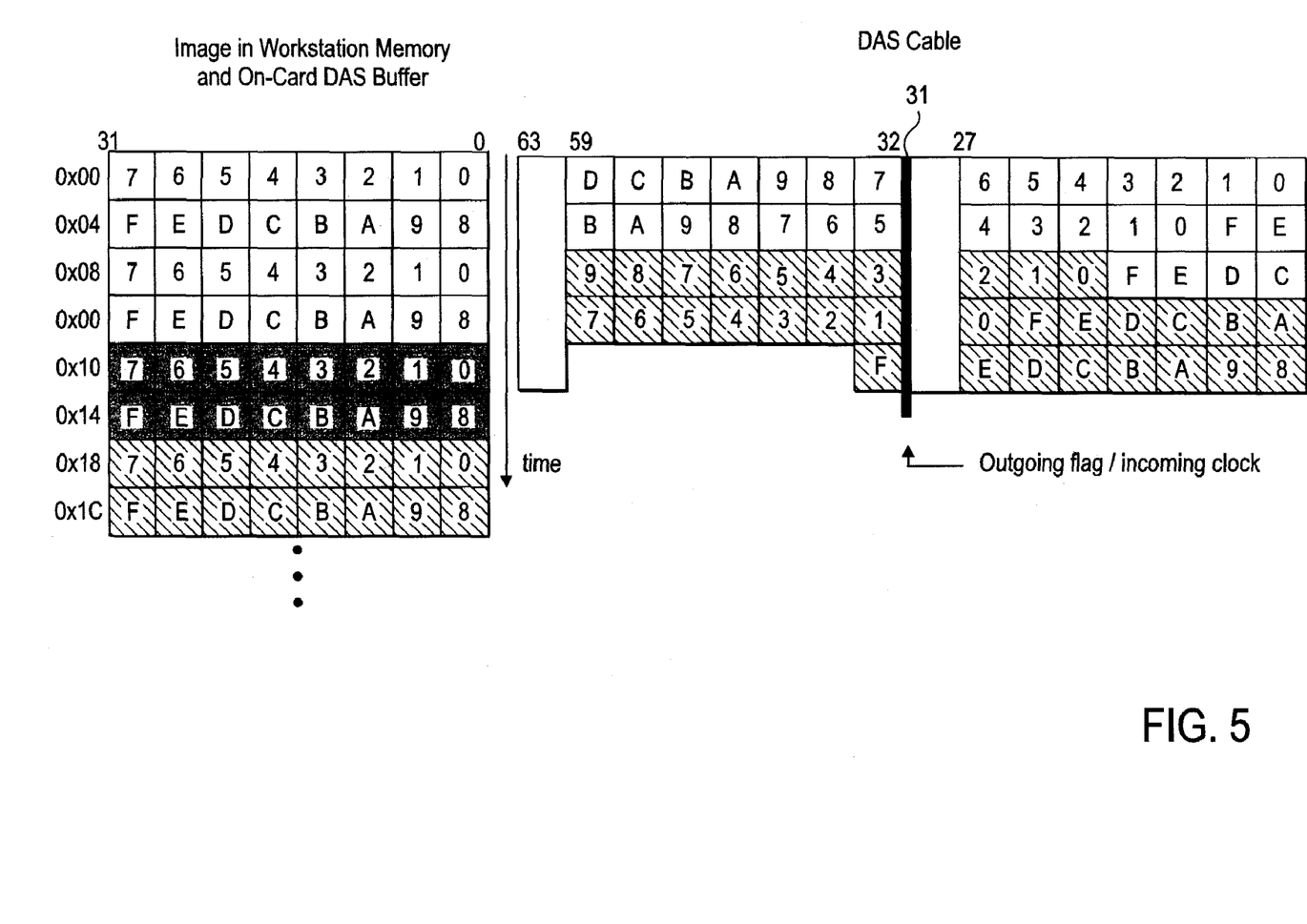
FIG. 5 illustrates a diagram of exemplary wide cable mode bit mapping, according to one embodiment of the present invention.

A further enhancement to the cable controller 80 allows it to repack data on the fly from the 32- or 64-bit chunks preferred by the workstation 10 into the 56-bit chunks in which they are transferred to the emulator. The 56-bit wide cable mode increases the bandwidth available to transfer data to the emulator 30. According to one embodiment, 56 bit-data is split between two internal high-speed cables. The data bits used may be the 28 lower bits used in the 32-bit mode, plus 28 bits on the second high-speed cable. The repacking ensures that there are no "holes" in the data from the workstation's point of view, which allows vectors of bits to be processed contiguously by software, avoiding unnecessary (and slow) bit manipulations by software. FIG. 5 illustrates a diagram of exemplary wide cable mode bit mapping, according to one embodiment of the present invention. This repacking is done entirely within the cable controller 80 and is completely transparent to the PCI controller 70, the RAM controller 75, and the emulator 30. As shown in FIG. 5, the bit position in the word in RAM 55 does not map directly to the bit position in the word on the cable 35. However, the index of a bit all the way through the buffer 35 is the same as the index of the bit through the entire cable transfer. The cable controller 80 may write an additional word of garbage at the end of the buffer 55 when receiving data from the cable 35.

The use of a local, dedicated DMA controller 24 decreases the latency to start a transfer and improves the integration of that controller 24 with the local buffer RAM 18. In prior devices, applications competed unfavorably with the operating system for use of the workstation's system DMA controller which was also used for hard disk transfers. In practice, the system DMA controller did not optimize well for burst PCI transfers to PCI devices.

Once the emulated design is compiled and the API loaded, many of the parameters of the transfers to the emulator are fixed: transfer size, buffer location, etc. With an instruction sequencer, the interface 20 can be pre-programmed to perform the desired transfer, then, once the workstation memory buffer 18 is ready, simply told to "go", minimizing the PCI accesses, and therefore latency, to setup and start a transfer. The instruction sequencer controls the data flow between the PCI bus 40, the local RAM 18, and the cable 35. This data path can be seen in FIG. 2, and the control paths can be seen in FIG. 3.

The RAM data path is fully pipelined as shown in FIG. 4 to maximize the RAM bandwidth and support simultaneous PCI and cable accesses to/from the local RAM 18. This simultaneous access supports "data streaming" which is used to reduce transfer latency by transferring data received by the cable immediately to PCI without waiting for the entire cable transfer to complete.

In the interest of increasing PCI bandwidth, the interface 20 is fully PCI 2.2 compliant, utilizing 64-bit bus width and 66 MHz signaling where available. In prior devices, data was organized in the workstation memory in the same way it was sent: 31 bits of data per word and 1 handshake bit in each word in the buffer. With interface 20, the cable 35 can handle up to 64 bits of data on some systems and 56 bits of data on others. All data is stored unfragmented and all 32 or 64 bits of the workstation data is useful data, eliminating the time consuming action of rearranging simulation data into 31 bit words. In the case of 56 bit transfers the bytes from the 64 bit buffers are rearranged by the interface circuitry (e.g. interface 20 in FIG. 1) to send the bytes in order, packing them into 56 bit words as shown in FIG. 5.

Figure 6:
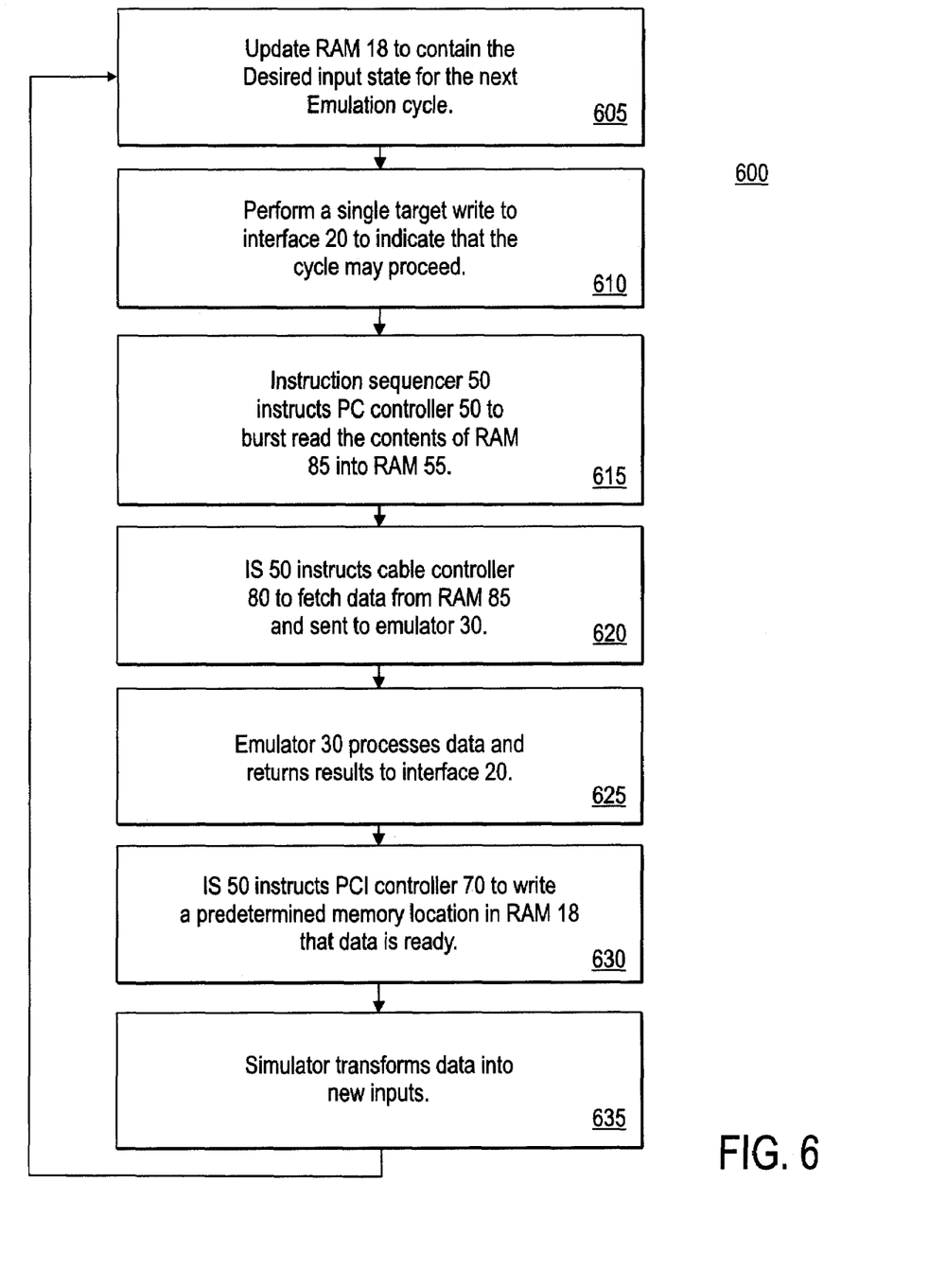
FIG. 6 illustrates an exemplary flow diagram of an exemplary transfer of data from the simulator to the emulator, according to one embodiment of the present invention.

FIG. 6 illustrates an exemplary flow diagram 600 of an exemplary transfer of data from the simulator to the emulator, according to one embodiment. The transfer of data includes state information and stimulus. The simulation updates its internal buffer 18 through the driver API on the workstation so that it contains the desired input state for the next emulation cycle (605). The simulator 10 then performs a single target write to the interface 20 to general registers 60 to start the instruction sequencer (610). At this point, the instruction sequencer 50 takes over and drives the rest of the cycle completely independent of the workstation's processor 15. The instruction sequencer 50 constantly monitors control signals from the general registers 60. Instruction sequences are read from RAM 55 by the instruction sequencer 50 and may indicate to the PCI initiator 70b to burst read the contents of the workstation's buffer 18 into the on-board buffer 55 (615). Next, it instructs the cable controller 80 to fetch data from the RAM 85 as needed and send it to the emulator 30 (620). The emulator then processes the data and sends the results back to the interface 20 (625). As data is received from the emulator 30, it is simultaneously uploaded to the workstation memory 18 through DMA 24 from the PCI controller 70 (which is referred to as streaming). Once all the data is transferred from the emulator 30, the instruction sequencer 50 commands the PCI controller 70 to write a predetermined memory location in the workstation memory 18 to alert the workstation processor 15 that the results of the emulation cycle are ready to be analyzed (630). The workstation 10 transforms the data into new inputs and the process repeats (635).

It is important to note that this is only a typical transfer and the reprogrammable sequencing nature of the instruction sequencer 50 allows many other possibilities. For example, if only very few bits change in the input, the instruction sequencer 50 can skip the burst read from the workstation memory 18 and the workstation 10 can modify the interface's buffer 55 directly through target writes. Another feature of the instruction sequencer 50 is the ability to repeat cable transfers until a specified condition in the return data is true. This ability is used to ensure that the data returned from the emulator 30 is in fact the result of a new emulator cycle rather than old data.

The various embodiments disclosed herein can also include several variations on the transmission protocol, including the continuous resending of the message buffer and a variable message size depending on message content.

The start of transfer may be triggered by a hardware event rather than under workstation control. The length of the message may be determined by the data in the message rather than set by the workstation software directly in the PCI space. Various local buffers may be sent in response to specific data in the received buffer.

An optimized interface for simulation and visualization data transfer between an emulation system and simulator is disclosed. Although the optimized interface has been described with respect to specific examples and subsystems, it will be apparent to those of ordinary skill in the art that it is not limited to these specific examples or subsystems but extends to other embodiments as well.

We claim:

1. An apparatus connecting a simulator to an emulator, comprising:
    a hardware interface, comprising
    a PCI controller;
    general registers connected to the PCI controller;
    an instruction sequencer connected to the general registers;
    a RAM controller connected to RAM;
    a cable interface controller;
    a PROM controller; and
    an EEPROM controller
    wherein the hardware interface is implemented within a field programmable gate array, and wherein the instruction sequencer completes emulation cycles independent of the simulator.

2. The apparatus of claim 1, wherein the general registers store controller information, controller mode, interrupt control, controller status, cable-in, clock control, instruction sequencer ("IS") instruction pointers, IS direct command, IS direct/step execute, PCI controller control, controller abort, EEPROM command, configuration JTAG command, configuration JTAG Out, configuration JTAG in, cable compare values, cable compare mask, PCI upload count, PCI download count, cable count, streaming control, and scratch.

3. The apparatus of claim 1, wherein the RAM stores instructions, the instructions including PCI DMA download, PCI DMA upload, cable download, cable transfer, and cable upload.

4. The apparatus of claim 1, wherein the cable interface controller exists on a PCI card and connects to a cable having a bandwidth of 96 MB/sec and a 64-bit data path at 12 MHz.

5. The apparatus of claim 1, wherein the RAM is zero bus turnaround RAM.

6. The apparatus of claim 1, wherein the cable interface controller repacks data on-the-fly from a first bit size associated with the simulator to a second bit size associated with the emulator.

7. The apparatus of claim 1, wherein the instruction sequencer repeats a cable transfer until a specified condition in returned-data is true.

8. An apparatus connecting a simulator to an emulator, comprising:
    a hardware interface, comprising
    a PCI controller;
    general registers connected to the PCI controller;
    an instruction sequencer connected to the general registers;
    a RAM controller connected to RAM;
    a cable interface controller;
    a PROM controller; and
    an EEPROM controller
wherein the hardware interface is implemented within a field programmable gate array, and wherein the instruction sequencer executes preprogrammed sequences of instructions.

* * * * *